United States Patent Office
3,763,140
Patented Oct. 2, 1973

3,763,140
HETEROCYCLIC IMMONIUM GROUP
CONTAINING AZO DYES
Roland Entschel, Basel, and Viktor Kaeppeli, Allschwil
Basel-Land, Switzerland, assignors to Sandoz Ltd.,
Basel, Switzerland
No Drawing. Filed Feb. 13, 1970, Ser. No. 11,350
Claims priority, application Switzerland, Mar. 4, 1969,
3,332/69; Apr. 8, 1969, 5,343/69, 5,344/69; Jan. 21,
1970, 798/70; Jan. 22, 1970, 839/70; Jan. 23, 1970,
923/70
Int. Cl. C09b 29/06, 43/00, 43/06
U.S. Cl. 260—158
22 Claims

ABSTRACT OF THE DISCLOSURE

Dyes of the formula

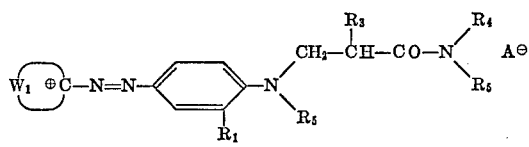

wherein $R_1$ is hydrogen, halo, alkyl, substituted alkyl, alkoxy or substituted alkoxy,
$R_2$ is hydrogen, alkyl, substituted alkyl, aryl, substituted aryl or

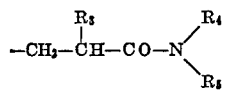

$R_3$ is hydrogen, alkyl or substituted alkyl,
each of $R_4$ and $R_5$ is independently hydrogen, alkyl, substituted alkyl, cycloalkyl, substituted cycloalkyl, aryl or substituted aryl,

is a heterocyclic ring containing at least one quaternary nitrogen group, e.g., benzothiazolium, imidazolium, indazolium, pyrazolium, oxazolium, isoxazolium, pyridiazinium and thiazolium, and substituted derivatives thereof, and
$A^\ominus$ is an anion.

The dyes are suitable for dyeing and printing polyacrylonitrile and acrylonitrile copolymer fibers. Resulting dyeings have good fastness to light, washing, perspiration, sublimation, steaming, water and cross-dyeing.

This invention relates to basic azo dyes containing cycloimmonium groups which are eminently suitable for dyeing and printing polyacrylonitrile and acrylonitrile copolymer fibres and the polyacrylonitrile or acrylonitrile copolymer fibre component of blend yarns and fabrics.
These new dyes are of the formula

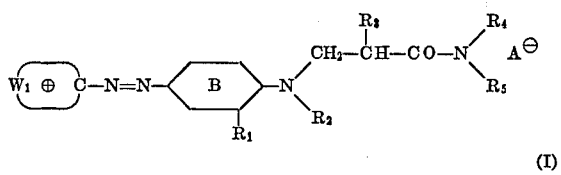

where
$R_1$ stands for hydrogen, halogen or an alkyl or alkoxy radical which may be substituted, $R_2$ for hydrogen or an alkyl or aryl radical which may be substituted or a group of the formula

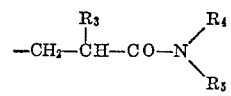

$R_3$ for hydrogen or an alkyl radical which may be substituted,
$R_4$ and $R_5$ stands for hydrogen or an alkyl, cycloalkyl or aryl radical which may be substituted,
$W_1$ for a constituent of a multi-membered ring which contains at least one quaternary nitrogen atom and may contain further hetero atoms and substituents and on which further cycloaliphatic, heterocyclic or aromatic rings may be condensed, and
$A^\ominus$ for an anion.

In this formula the radicals $R_1$ and $R_2$ and/or the radicals $R_4$ and $R_5$, together with the N atom bound to $R_2$ or $R_4$, respectively, may form heterocycles and the aromatic ring B may be further substituted by non-water-solubilizing substituents.
More specifically, the new dyes have the formula

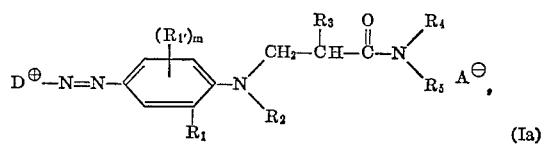

(Ia)

wherein $D^\oplus$ is

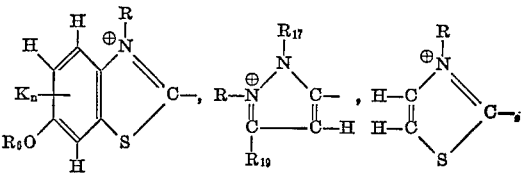

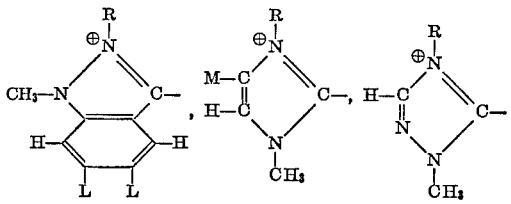

or

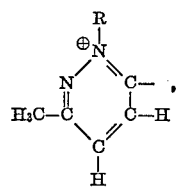

wherein
R is alkyl, substituted alkyl, cyclohexyl or phenyl,
$R_1$ is hydrogen, halo, alkyl, substituted alkyl, alkoxy or substituted alkoxy,
$R_1'$ is halo, alkyl, substituted alkyl, alkoxy, substituted alkoxy, cyano, nitro, alkylsulfonyl, substituted alkylsulfonyl, phenylsulfonyl, substituted phenylsulfonyl, naphthylsulfonyl, substituted naphthylsulfonyl, tetrahydronaphthylsulfonyl or substituted tetrahydronaphthylsulfonyl, $R_2$ is hydrogen, alkyl, substituted alkyl, phenyl, substituted phenyl, naphthyl, substituted naphthyl, tetrahydronaphthyl substituted tetrahydronaphthyl or

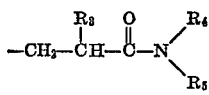

$R_3$ is hydrogen, alkyl or substituted alkyl,
each $R_4$ and each $R_5$ independently is hydrogen, alkyl, substituted alkyl, cyclohexyl, substituted cyclohexyl, phenyl, substituted phenyl, naphthyl, substituted naphthyl substituted tetrahydronaphthyl or thyl,
$R_6$ is alkyl, substituted alkyl, phenyl, substituted phenyl, naphthyl, substituted naphthyl, tetrahydronaphthyl or substituted tetrahydronaphthyl,
$R_{17}$ is phenyl or substituted phenyl,
$R_{19}$ is alkyl or substituted alkyl,
K is halo, alkyl, substituted alkyl, alkoxy, cyano, nitro, alkylsulfonyl, substituted alkylsulfonyl, phenylsulfonyl, substituted phenysulfonyl, naphthylsulfonyl, substituted naphthylsulfonyl, tetrahydronaphthylsulfonyl or substituted tetrahydronaphthylsulfonyl,
L is hydrogen or nitro, with the proviso that only one L can be nitro,
M is hydrogen or methyl,
$m$ is 0 or 1,
$n$ is 0 or 1, and
$A^\ominus$ is an anion,
wherein each substituent of substituted alkyl, substituted alkoxy, substituted alkylsulfonyl and substituted cyclohexyl independently is halo, hydroxy, cyano, phenyl, substituted phenyl, naphthyl, substituted naphthyl, tetrahydronaphthyl or substituted tetrahydronaphthyl,
each substituent of substituted phenyl, substituted naphthyl, substituted tetrahydronaphthyl, substituted phenoxy, substituted naphthyloxy, substituted tetrahydronaphthyloxy, substituted phenylsulfonyl, substituted naphthylsulfonyl and substituted tetrahydronaphthylsulfonyl independently is halo, hydroxy, cyano, alkyl, alkoxy or phenyl,
each alkyl and alkyl chain of substituted alkyl, alkylsulfonyl and substituted alkylsulfonyl independently has 1 to 12 carbon atoms, and
each alkoxy and alkyl chain of substituted alkoxy independently has 1 to 6 carbon atoms.

Those compounds
wherein $R_1$ is hydrogen, ahlo, alkyl, substituted alkyl or alkoxy,
$R_1'$ is halo, alkyl, substituted alkyl, alkoxy, cyano, nitro, methylsulfonyl, ethylsulfonyl or phenylsulfonyl,
$R_2$ is hydrogen, alkyl, substituted alkyl, phenyl or

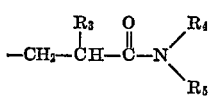

each $R_4$ and each $R_5$ independently is hydrogen, alkyl, substituted alkyl, cyclohexyl, trimethylcyclohexyl or phenyl, and
each substituent of substituted alkyl independently is halo, hydroxy, cyano or phenyl
are preferred, with those compounds
wherein
R is alkyl,
$R_1$ is hydrogen, halo, alkyl or alkoxy,
$R_1'$ is halo, alkyl or alkoxy,
$R_3$ is hydrogen or alkyl,
each substituted alkyl is monosubstituted alkyl and the substituent of each monosubstituted alkyl independently is hydroxy or phenyl, each alkyl and alkyl chain of substituted alkyl independently has 1 to 4 carbon atoms, and
each alkoxy independently has 1 to 3 carbon atoms being particularly preferred.

The new dyes can be produced by quaternation of a compound of the formula

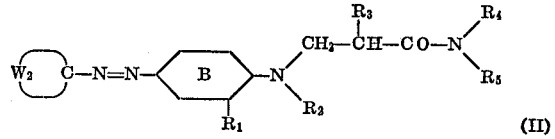

where $W_2$ represents a constituent of a multi-membered ring which contains at least one quaternatable nitrogen atom and may contain further hetero atoms and substituents and on which further cycloaliphatic, heterocyclic or aromatic rings may be condensed.

Dyes of good quality conform to the formula

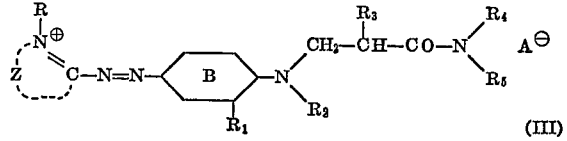

where

R represents a hydrocarbon radical which may be substituted, and
Z a constituent of a ring which may be further substituted.

Other dyes of comparable quality have the formula

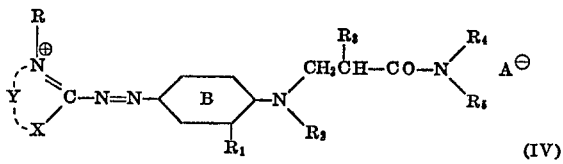

where

Y represents a constituent of a five- or six-membered ring which may be substituted
and X a sulphur or nitrogen atom, the latter of which may be substituted.

Similarly good dyes are of the formula

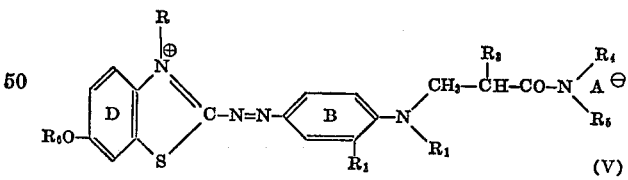

where $R_6$ represents an alkyl or aryl radical which may be substituted
and the aromatic ring D may be substituted by non-water-solubilizing substituents;
of the formula

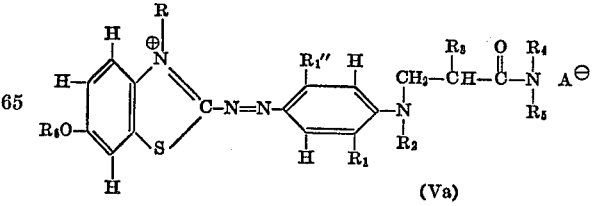

wherein $R_1''$ is hydrogen or $R_1'$, and preferably wherein

R is methyl or ethyl,
$R_1$ is hydrogen, halo, alkyl or alkoxy, $R_1''$ is hydrogen, halo, alkyl or alkoxy,
$R_2$ is hydrogen, alkyl, monosubstituted alkyl, phenyl or

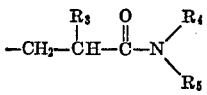

$R_3$ is hydrogen or alkyl,
each $R_4$ and each $R_5$ independently is hydrogen, alkyl, monosubstituted alkyl, cyclohexyl, 3,3,5-trimethylcyclohexyl or phenyl,
$R_6$ is alkyl or phenyl,
the substituent of each monosubstituted alkyl independently is hydroxy or phenyl,
each alkyl and alkyl chain of monosubstituted alkyl independently has 1 to 4 carbon atoms, and
each alkoxy independently has 1 to 3 carbon atoms, and more preferably
wherein
$R_1$ is hydrogen, alkyl (preferably methyl) alkoxy (preferably methoxy) or chloro,
$R_1''$ is hydrogen, alkyl (preferably methyl), alkoxy (preferably methoxy) or halo,
$R_2$ is hydrogen, alkyl, β-hydroxyethyl, benzyl, phenyl or

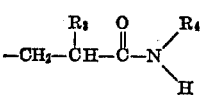

$R_3$ is hydrogen or methyl,
each $R_4$ independently is hydrogen, alkyl, benzyl, phenyl, cyclohexyl or 3,3,5-trimethylcyclohexyl, and
$R_5$ is hydrogen,
and of the formula

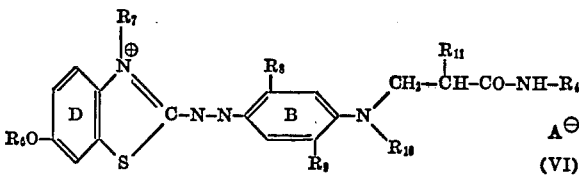

where
$R_7$ stands for methyl or ethyl,
$R_8$ for hydrogen, halogen or an alkyl or alkoxy radical which may be substituted,
$R_9$ for hydrogen or an alkyl or alkoxy radical which may be substituted,
$R_{10}$ for an alkyl or aryl radical which may be substituted or for a group of the formula

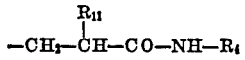

and
$R_{11}$ for hydrogen or methyl.

Particularly good dyes conform to the formula

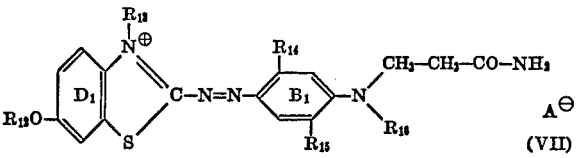

where
$R_{12}$ stands for —$CH_3$ or —$C_2H_5$,
$R_{13}$ for —$CH_3$ or —$C_2H_5$,
$R_{14}$ for hydrogen or —$CH_3$,
$R_{15}$ for hydrogen
and $R_{16}$ for —$CH_3$, —$C_2H_5$, —$C_4H_9$ or

—$CH_2$—$CH_2$—CO—$NH_2$ and the aromatic rings $D_1$ and $B_1$ bear no further substituents;

and in particular dyes of the formula

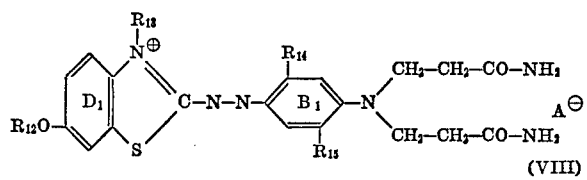

(VIII)

Dyes of similarly good quality are of the formula

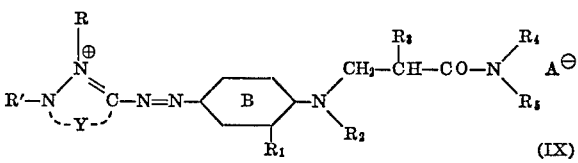

(IX)

where
R' represents hydrogen or a hydrocarbon radical which may be substituted, e.g. an optionally substituted alkyl or phenyl radical;
of the formula

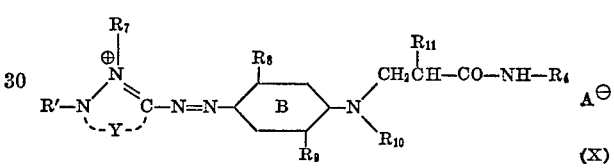

(X)

and of the formula

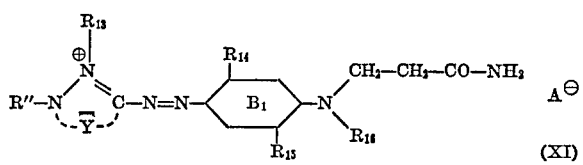

(XI)

where R" represents methyl or ethyl.

Equally good dyes are of the formula

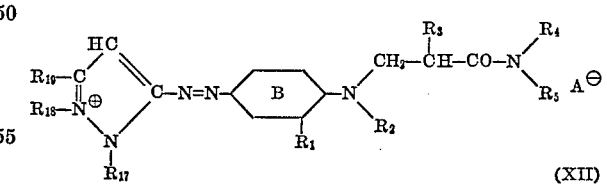

(XII)

or of the formula

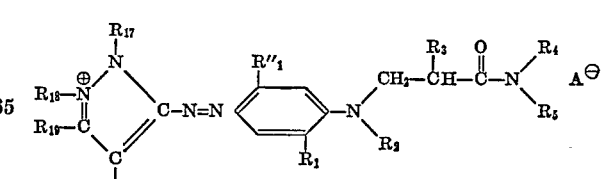

(XIIa)

where
$R_{17}$ represents a phenyl radical which may be substituted,
$R_{18}$ an alkyl radical which may be substituted and
$R_{19}$ an alkyl radical which may be substituted.

Preferably, each substituted alkyl is monosubstituted alkyl,
each alkyl and alkyl chain of monosubstituted alkyl has 1 to 4 carbon atoms,
each alkoxy independently has 1 to 3 carbon atoms, and
$R_1''$ is hydrogen.

Similarly good dyes are of the formula

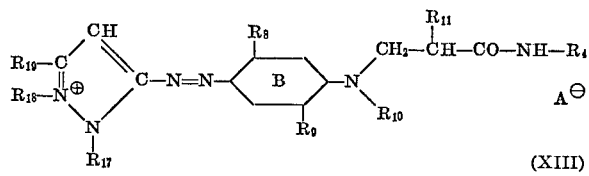

(XIII)

preferably wherein $R_{17}$ is phenyl,
$R_{18}$ is alkyl, and
$R_{19}$ is alkyl.
and of the formula

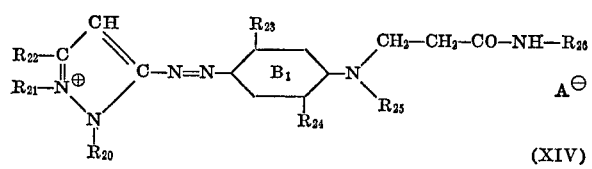

(XIV)

where $R_{20}$ represents a phenyl radical,
$R_{21}$ —CH$_3$ or —C$_2$H$_5$,
$R_{22}$ —CH$_3$ or —C$_2$H$_5$,
$R_{23}$ hydrogen, chlorine, —CH$_3$ or —OCH$_3$,
$R_{24}$ hydrogen,
$R_{25}$ —CH$_3$, —C$_2$H$_5$, —C$_4$H$_9$, —C$_2$H$_4$—CO—NH$_2$ or C$_2$H$_4$—CO—NH—C$_2$H$_5$
and $R_{26}$ hydrogen, —CH$_3$ or —C$_2$H$_5$.

The new dyes of the formula III can be produced by reacting a compound of formula

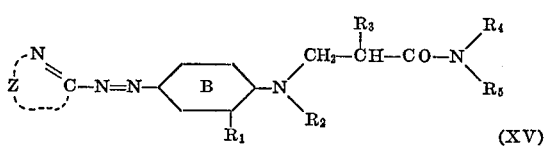

(XV)

with a quaternating agent, e.g. a compound of the formula

R—A  (XVI)

where A representing a radical which is convertible into an anion A$^{\ominus}$.

The new dyes of Formulae I and III, and in particular those of Formula IX, can also be produced by the oxidative coupling of hydrazones of heterocyclic compounds, whose radicals are of the formula

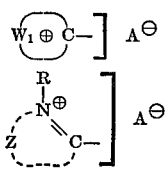

(XVII)

(VIIIX)

or

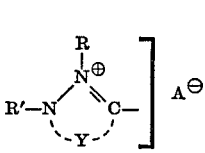

(XIX)

or of functional derivatives of these hydrazones, with amines of the formula

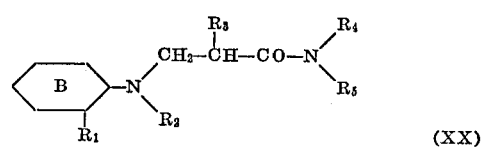

(XX)

Dyes of Formula XII can be synthesized by reacting a compound of formula

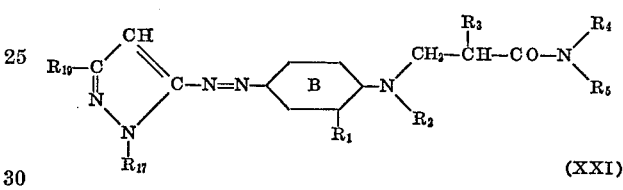

(XXI)

with a quaternating agent, e.g. a compound of the $R_{18}$—A  (XXII)

where A represents a radical which is convertible into an anion A$^{\ominus}$.

The anion A$^{\ominus}$ in the compounds of Formula I can be replaced by other anions, e.g. with the aid of an ion exchanger or by reaction with salts or acids, if necessary in more than one stage, e.g. via the hydroxide.

The anion A$^{\ominus}$ may be an organic or an inorganic ion, e.g. the ion of a halogen, such as chloride, bromide or iodide; or of sulphate, disulphate, methyl sulphate, aminosulphonate, perchlorate, carbonate, bicarbonate, phosphate, phosphorus tungstate, phosphorus tungstic molybdate, benzenesulphonate, naphthalenesulphonate, 4-chlorobenzenesulphonate, 4-methylbenzenesulphonate, oxalate, maleinate, acetate, propionate, methanesulphonate, lactate, succinate, tartrate, chloracetate, borate or benzoate, or complex ions, such as that of zinc chloride double salts.

The quaternation reaction can be effected by the known methods, e.g. in an inert solvent, in a solvent-water mixture or in water alone, at equimolecular ratio or preferably with an excess of the quaternating agent and with a buffered medium; the range of —20° C. to +200° C. is employable, but temperatures of —30° C. to 120° C. are preferred for the reaction. The reaction can often be facilitated by the addition of basic compounds, such as magnesium oxide or sodium acetate.

Examples of suitable quaternating agents are alkyl halides, e.g. methyl and ethyl chloride, bromide and iodide; alkylsulphates, e.g. dimethyl sulphate; acrylic amides/ hydrogen halides, e.g. CH$_2$=CH—CO—NH$_2$/HCl; epoxides, e.g. ethylene oxide, propylene oxide; epichlorohydrin.

The oxidative coupling reaction can be carried out by any of the known methods.

The compounds of Formula I are preferably free from water-solubilizing substituents. In particular they are free sulfo groups, though they may bear one carboxy group.

In every instance "halogen" represents chlorine, bromine, fluorine or iodine.

The alkyl radicals generally contain 1 to 12, or 1 to 6 or preferably 1, 2, 3 or 4 carbon atoms. If these radicals are substituted they may bear, in particular, halogen atoms, hydroxyl or cyano groups or aryl radicals, for example phenyl radicals. In such cases "alkyl" represents an aralkyl radical, e.g. a benzyl radical.

The aryl radicals, such as phenyl, naphthyl or tetrahydronaphthyl radicals, may be substituted, in particular by halogen atoms, hydroxyl or cyano groups, alkyl or alkoxy radicals, or by aryl radicals, such as phenyl radicals.

The alkoxy radicals may bear 1 to 6 or, preferably, 1, 2 or 3 carbon atoms.

The hydrocarbon radicals may be optionally substituted alkyl, cycloalkyl or aryl radicals, e.g. cyclohexyl or phenyl radicals.

Examples of non-water-solubilizing substituents are halogen atoms, optionally substituted alkyl and alkoxy radicals, preferably lower radicals, the cyano or the nitro group, an optionally substituted alkyl- or arylsulphonyl group, e.g. a methyl, ethyl or phenylsulphonyl radical, an acylated amino group, a substituted sulphonic acid amide group, e.g. a disubstituted sulphonic acid amide group.

Examples of heterocyclic, preferably five- or six-membered ring systems based upon the structures

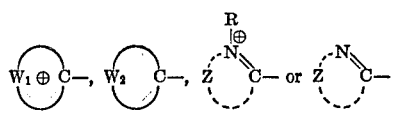

are thiazoles, such as benzothiazoles, thiadiazoles, indazoles, imidazoles, oxazoles, isoxazoles, pyrazoles, pyridines and quinolines.

The amines of Formula XX can be formed by reacting a substituted or unsubstituted 1-aminobenzene with 1 or 2 moles of an acrylamide. Compounds of Formula II or XV can be obtained by coupling the diazo compound of a heterocyclic amine with a coupling component of Formula XX.

The new dyes are employed for dyeing and printing polyacrylonitrile and acrylonitrile copolymer fibres, the polyacrylonitrile or acrylonitrile copolymer fibre component of blend yarns and fabrics, and textiles made thereof. They can also be dyed and printed on polyamide and polyester fibres modified by the introduction of an acid group. Polyamide fibres of this type are known, for example, from Belgian Pat. 706,104 and the corresponding polyester fibres from U.S. Pats. 3,018,272 and 3,379,723. Further, the dyes are suitable for dyeing leather and paper.

The dyes are best applied from aqueous neutral or acid medium in the temperature range of 60–100° C. or at temperatures above 100° C. with pressure. They give level dyeings without the assistance of retarders.

dyeing tannin-treated cotton, regenerated cellulosic fibres and polyamide fibres. It has been found that mixtures of two or more of the new dyes and mixtures of these with other cationic dyes can be employed with good success.

The dyeings obtained with the new dyes have good light fastness, have good fastness to wet treatments, e.g. washing, perspiration, sublimation, pleating, decatizing, pressing, steaming, water, sea water, cross dyeing and solvents show good compatibility with salts and are well suited, especially in water. They are stable to boiling and to pH conditions and reserve wool. In comparison with the next comparable dyes of U.S. Pat. 3,132,132, the dyes of Formula I have better level dyeing properties and better light fastness on polyacrylonitrile fibres.

In the following examples the parts and percentages are by weight and the temperatures are given in degrees centigrade.

EXAMPLE 1

9.6 parts of a compound of the formula

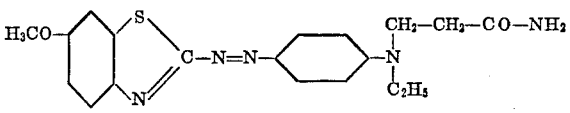

are stirred into 100 parts of glacial acetic acid; 1.1 parts of magnesium oxide are added and the mixture is raised to 60–70°. In the next 30 minutes 6.3 parts of dimethyl sulphate are dropped in with stirring, after which stirring is continued for 3 hours at 70–75°. The mixture is then run into 1000 parts of water and the dye isolated by the addition of 50 parts of sodium chloride and 7 parts of zinc chloride, filtered off, washed and dried. On polyacrylonitrile fibres it gives level blue dyeings of good light and wet fastness.

EXAMPLE 2

44.1 parts of a compound of the formula

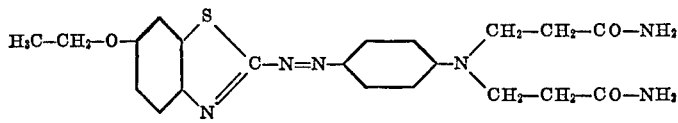

are stirred into 300 parts of glacial acetic acid, 4.1 parts of magnesium oxide are added and the mixture is raised to 60–70°. In 45 minutes 25.2 parts of dimethyl sulphate are dropped in so that the temperatures remains constant, then stirring is continued for 3 hours at 75°. Subsequently the mixture is stirred into 2000 parts of water and the dye precipitated by the addition of 200 parts of common salts and 28 parts of zinc chloride, filtered off and washed with 5% sodium chloride solution. On polyacrylonitrile fibres level blue dyeings with good fastness to light and wet treatments are obtained with this dye.

Additional dyes are set forth in Table 1. They can be produced by the procedures of Example 1 or 2 and have the formula

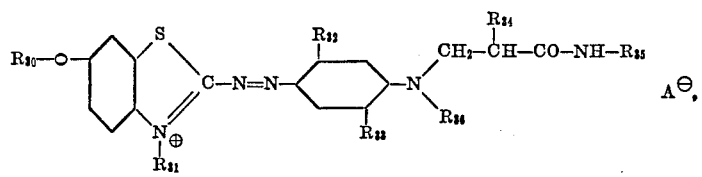

The dyes of this disclosure which have good solubility in organic solvents are suitable for the coloration of natural and synthetic resins and of plastics in he dissolved and undissolved state. A number can be employed for where $R_{30}$ to $R_{36}$ have the significance given them in the table.

The anion $A^{\ominus}$ may be any one of those named in the specification.

TABLE 1

| Example number | $R_{30}$ | $R_{31}$ | $R_{32}$ | $R_{33}$ | $R_{34}$ | $R_{35}$ | $R_{36}$ | Shade of dyeing on polyacrylonitrile fibre |
|---|---|---|---|---|---|---|---|---|
| 3 | —CH$_3$ | —CH$_3$ | H | H | H | H | —CH$_3$ | Blue. |
| 4 | —CH$_3$ | —C$_2$H$_5$ | H | H | H | H | —CH$_3$ | Do. |
| 5 | —CH$_3$ | —C$_2$H$_5$ | H | H | H | H | —C$_2$H$_5$ | Do. |
| 6 | —CH$_3$ | —CH$_3$ | H | H | H | H | —C$_4$H$_9$ | Do. |
| 7 | —CH$_3$ | —C$_2$H$_5$ | H | H | H | H | —C$_4$H$_9$ | Do. |
| 8 | —CH$_3$ | —CH$_3$ | H | H | H | H | —C$_2$H$_4$OH | Do. |
| 9 | —CH$_3$ | —C$_2$H$_5$ | H | H | H | H | —C$_2$H$_4$OH | Do. |
| 10 | —CH$_3$ | —CH$_3$ | H | H | H | H | —C$_6$H$_5$ | Do. |
| 11 | —CH$_3$ | —C$_2$H$_5$ | H | H | H | H | —C$_6$H$_5$ | Do. |
| 12 | —CH$_3$ | —CH$_3$ | H | H | H | H | —CH$_2$—C$_6$H$_5$ | Do. |
| 13 | —CH$_3$ | —C$_2$H$_5$ | H | H | H | H | —CH$_2$—C$_6$H$_5$ | Do. |
| 14 | —CH$_3$ | —CH$_3$ | H | H | H | H | —C$_2$H$_4$CONH$_2$ | Do. |
| 15 | —CH$_3$ | —C$_2$H$_5$ | H | H | H | H | —C$_2$H$_4$CONH$_2$ | Do. |
| 16 | —CH$_3$ | —CH$_3$ | —CH$_3$ | H | H | H | —CH$_3$ | Do. |
| 17 | —CH$_3$ | —C$_2$H$_5$ | —CH$_3$ | H | H | H | —CH$_3$ | Do. |
| 18 | —CH$_3$ | —CH$_3$ | —CH$_3$ | H | H | H | —C$_2$H$_5$ | Do. |
| 19 | —CH$_3$ | —C$_2$H$_5$ | —CH$_3$ | H | H | H | —C$_2$H$_5$ | Do. |
| 20 | —CH$_3$ | —CH$_3$ | —CH$_3$ | H | H | H | —C$_2$H$_4$OH | Do. |
| 21 | —CH$_3$ | —CH$_3$ | —CH$_3$ | H | H | H | —C$_2$H$_4$CONH$_2$ | Do. |
| 22 | —CH$_3$ | —C$_2$H$_5$ | —CH$_3$ | H | H | H | —C$_2$H$_4$CONH$_2$ | Do. |
| 23 | —CH$_3$ | —CH$_3$ | —CH$_3$ | H | H | H | —CH$_2$—C$_6$H$_5$ | Do. |
| 24 | —CH$_3$ | —CH$_3$ | Cl | H | H | H | —CH$_3$ | Do. |
| 25 | —CH$_3$ | —CH$_3$ | Cl | H | H | H | —C$_2$H$_5$ | Do. |
| 26 | —CH$_3$ | —CH$_3$ | Cl | H | H | H | —C$_2$H$_4$OH | Do. |
| 27 | —CH$_3$ | —CH$^3$ | Cl | H | H | H | —C$_2$H$_4$—CONH$_2$ | Do |
| 28 | —CH$_3$ | —CH$_3$ | Cl | H | H | H | —CH$_2$—C$_6$H$_5$ | Do |
| 29 | —CH$_3$ | —CH$_3$ | Br | H | H | H | —C$_2$H$_5$ | Do |
| 30 | —CH$_3$ | —CH$_3$ | Br | H | H | H | —C$_2$H$_4$—CONH$_2$ | Do |
| 31 | —CH$_3$ | —CH$_3$ | F | H | H | H | —C$_2$H$_4$—CONH$_2$ | Do |
| 32 | —CH$_3$ | —CH$_3$ | —OCH$_3$ | H | H | H | —C$_2$H$_5$ | Do |
| 33 | —CH$_3$ | —CH$_3$ | —OCH$_3$ | H | H | H | —CH$_3$ | Do |
| 34 | —CH$_3$ | —CH$_3$ | —OCH$_3$ | H | H | H | —C$_2$H$_4$—CONH$_2$ | Do |
| 35 | —CH$_3$ | —CH$_3$ | —OCH$_3$ | —OCH | H | H | —CH$_3$ | Do |
| 36 | —CH$_3$ | —CH$_3$ | —OCH$_3$ | —OCH$_3$ | H | H | —C$_2$H$_5$ | Do |
| 37 | —CH$_3$ | —CH$_3$ | —OCH$_3$ | —OCH$_3$ | H | H | —C$_2$H$_4$—CONH$_2$ | Do |
| 38 | —CH$_3$ | —CH$_3$ | —CH$_3$ | —CH$_3$ | H | H | —C$_2$H$_5$ | Do |
| 39 | —CH$_3$ | —CH$_3$ | —CH$_3$ | —CH$_3$ | H | H | —C$_2$H$_4$—CONH$_2$ | Do |
| 40 | —C$_2$H$_5$ | —CH$_3$ | H | H | H | H | —CH$_3$ | Do |
| 41 | —C$_2$H$_5$ | —CH$_3$ | H | H | H | H | —C$_2$H$_5$ | Do |
| 42 | —C$_2$H$_5$ | —CH$_3$ | H | H | H | H | —C$_2$H$_4$OH | Do |
| 43 | —C$_2$H$_5$ | —CH$_3$ | H | H | H | H | —C$_6$H$_5$ | Do |
| 44 | —C$_2$H$_5$ | —CH$_3$ | H | H | H | H | —CH$_2$—C$_6$H$_5$ | Do |
| 45 | —C$_2$H$_5$ | —C$_2$H$_5$ | H | H | H | H | —CH$_3$ | Do |
| 46 | —C$_2$H$_5$ | —C$_2$H$_5$ | H | H | H | H | —C$_2$H$_5$ | Do |
| 47 | —C$_2$H$_5$ | —C$_2$H$_5$ | H | H | H | H | —C$_2$H$_4$OH | Do |
| 48 | —C$_2$H$_5$ | —C$_2$H$_5$ | H | H | H | H | —C$_2$H$_4$—CONH$_2$ | Do |
| 49 | —C$_2$H$_5$ | —C$_2$H$_5$ | H | H | H | H | —CH$_2$—C$_6$H$_5$ | Do |
| 50 | —C$_2$H$_5$ | —CH$_3$ | —CH$_3$ | H | H | H | —C$_2$H$_5$ | Do |
| 51 | —C$_2$H$_5$ | —CH$_3$ | Cl | H | H | H | —C$_2$H$_5$ | Do |
| 52 | —C$_2$H$_5$ | —CH$_3$ | —OCH$_3$ | H | H | H | —C$_2$H$_5$ | Do |
| 53 | —C$_2$H$_5$ | —CH$_3$ | —OCH$_3$ | —OCH$_3$ | H | H | —C$_2$H$_5$ | Do |
| 54 | —C$_2$H$_5$ | —CH$_3$ | —CH$_3$ | —CH$_3$ | H | H | —C$_2$H$_5$ | Do |
| 55 | —C$_2$H$_5$ | —CH$_3$ | —CH$_3$ | H | H | H | —C$_2$H$_4$OH | Do |
| 56 | —C$_2$H$_5$ | —CH$_3$ | Cl | H | H | H | —C$_2$H$_4$OH | Do. |
| 57 | —C$_2$H$_5$ | —CH$_3$ | —CH$_3$ | H | H | H | —C$_2$H$_4$—CONH$_2$ | Do. |
| 58 | —C$_2$H$_5$ | —CH$_3$ | Cl | H | H | H | —C$_2$H$_4$—CONH$_2$ | Do. |
| 59 | —C$_2$H$_5$ | —CH$_3$ | Br | H | H | H | —C$_2$H$_4$—CONH$_2$ | Do. |
| 60 | —C$_2$H$_5$ | —CH$_3$ | F | H | H | H | —C$_2$H$_4$—CONH$_2$ | Do. |
| 61 | —C$_2$H$_5$ | —CH$_3$ | —OCH$_3$ | H | H | H | —C$_2$H$_4$—CONH$_2$ | Do. |
| 62 | —C$_2$H$_5$ | —CH$_3$ | —OCH$_3$ | —OCH$_3$ | H | H | —C$_2$H$_4$—CONH$_2$ | Do. |
| 63 | —C$_2$H$_5$ | —CH$_3$ | —CH$_3$ | —CH$_3$ | H | H | —C$_2$H$_4$—CONH$_2$ | Do. |
| 64 | —C$_2$H$_5$ | —C$_2$H$_5$ | Cl | H | H | H | —C$_2$H$_4$—CONH$_2$ | Do. |
| 65 | —C$_2$H$_5$ | —C$_2$H$_5$ | —CH$_3$ | H | H | H | —C$_2$H$_4$—CONH$_2$ | Do. |
| 66 | —C$_2$H$_5$ | —C$_2$H$_5$ | —OCH$_3$ | H | H | H | —C$_2$H$_4$—CONH$_2$ | Do. |
| 67 | —C$_6$H$_5$ | —CH$_3$ | H | H | H | H | —C$_2$H$_5$ | Do. |
| 68 | —C$_6$H$_5$ | —CH$_3$ | H | H | H | H | —C$_2$H$_4$OH | Do. |
| 69 | —C$_6$H$_5$ | —CH$_3$ | H | H | H | H | —C$_2$H$_4$—CONH$_2$ | Do. |
| 70 | —C$_6$H$_5$ | —C$_2$H$_5$ | H | H | H | H | —C$_2$H$_4$—CONH$_2$ | Do. |
| 71 | —C$_6$H$_5$ | —CH$_3$ | —CH$_3$ | H | H | H | —C$_2$H$_4$—CONH$_2$ | Do. |
| 72 | —C$_6$H$_5$ | —CH$_3$ | Cl | H | H | H | —C$_2$H$_4$—CONH$_2$ | Do. |
| 73 | —CH$_3$ | —CH$_3$ | H | H | —CH$_3$ | H | —CH$_3$ | Do. |
| 74 | —CH$_3$ | —CH$_3$ | H | H | —CH$_3$ | H | —C$_2$H$_5$ | Do. |
| 75 | —CH$_3$ | —CH$_3$ | H | H | —CH$_3$ | H | —C$_2$H$_4$OH | Do. |
| 76 | —CH$_3$ | —CH$_3$ | H | H | —CH$_3$ | H | —C$_2$H$_4$—CONH$_2$ | Do. |
| 77 | —CH$_3$ | —CH$_3$ | H | H | —CH$_3$ | H | —CH$_2$CH(CH$_3$)CONH$_2$ | Do. |
| 78 | —CH$_3$ | —C$_2$H$_5$ | H | H | —CH$_3$ | H | Same as above | Do. |
| 79 | —CH$_3$ | —CH$_3$ | —CH$_3$ | H | —CH$_3$ | H | do | Do. |
| 80 | —CH$_3$ | —CH$_3$ | —CH$_3$ | H | —CH$_3$ | H | do | Do. |
| 81 | —C$_2$H$_5$ | —CH$_3$ | H | H | —CH$_3$ | H | —C$_2$H$_5$ | Do. |
| 82 | —C$_2$H$_5$ | —CH$^3$ | H | H | —CH$_3$ | H | —CH$_2$CH(CH$_3$)CONH$_2$ | Do. |
| 83 | —C$_2$H$_5$ | —CH$_3$ | —CH$_3$ | H | —CH$_3$ | H | Same as above | Do. |
| 84 | —C$_2$H$_5$ | —CH$_3$ | Cl | H | —CH$_3$ | H | do | Do. |
| 85 | —CH$_3$ | —CH$_3$ | H | H | H | —CH$_3$ | —C$_2$H$_5$ | Do. |
| 86 | —CH$_3$ | —CH$_3$ | H | H | H | —CH$_3$ | —C$_2$H$_4$CONHCH$_3$ | Do- |
| 87 | —C$_2$H$_5$ | —CH$_3$ | H | H | H | —CH$_3$ | —C$_2$H$_4$CONHCH$_3$ | |
| 88 | —CH$_3$ | —CH$_3$ | H | H | H | —C]H$_5$ | —C$_2$H$_5$ | Do. |
| 89 | —CH$_3$ | —CH$_3$ | H | H | H | —CH$_3$ | —C$_2$H$_4$CONHC$_2$H$_5$ | Do. |
| 90 | —CH$_3$ | —CH$_3$ | H | H | H | —CH$_3$ | —C$_2$H$_4$OH | Do. |
| 91 | —C$_2$H$_5$ | —CH | H | H | H | —CH$_3$ | —C$_2$H$_4$CONHC]H$_5$ | Do. |
| 92 | —CH$_3$ | —C$_2$H$_5$ | H | H | H | —CH$_3$ | —C$_2$H$_4$CONHC$_2$H$_5$ | Do. |
| 93 | —CH$_3$ | —CH$_3$ | H | H | H | —C$_6$H$_5$ | —C$_2$H$_5$ | Do. |
| 94 | —CH$_3$ | —CH$_3$ | H | H | H | —C$_6$H$_5$ | —C$_2$H$_4$OH | Do. |
| 95 | —CH$_3$ | —CH$_3$ | H | H | H | —C$_6$H$_5$ | —C$_2$H$_4$CONHC$_6$H$_5$ | Do. |
| 96 | —CH$_3$ | —CH$_3$ | —CH$_3$ | H | H | —C$_6$H$_5$ | —C$_2$H$_4$CONHC$_6$H$_5$ | Do. |

TABLE 1—Continued

| | $R_{30}$ | $R_{31}$ | $R_{32}$ | $R_{33}$ | $R_{34}$ | $R_{35}$ | $R_{36}$ | Shade of dyeing on polyacrylonitrile fibre |
|---|---|---|---|---|---|---|---|---|
| 97 | —$CH_3$ | —$CH_3$ | —$OCH_3$ | H | H | —$C_6H_5$ | —$C_2H_4CONHC_6H_5$ | Blue. |
| 98 | —$CH_3$ | —$CH_3$ | Cl | H | H | —$C_6H_5$ | —$C_2H_4CONHC_6H_5$ | Do. |
| 99 | —$C_2H_5$ | —$CH_3$ | H | H | H | —$C_6H_5$ | —$C_2H_4CONHC_6H_5$ | Do. |
| 100 | —$C_2H_5$ | —$CH_3$ | —$CH_3$ | H | H | —$C_6H_5$ | —$C_2H_4CONHC_6H_5$ | Do. |
| 101 | —$CH_3$ | —$C_2H_5$ | H | H | H | —$C_6H_5$ | —$C_2H_4CONHC_6H_5$ | Do. |
| 102 | —$CH_3$ | —$C_2H_5$ | H | H | H | —$CH_3$ | —$C_2H_4CONHCH_3$ | Do. |
| 103 | —$CH_3$ | —$CH_3$ | —$CH_3$ | H | H | —$CH_3$ | —$C_2H_4CONHCH_3$ | Do. |
| 104 | —$CH_3$ | —$CH_3$ | Cl | H | H | —$CH_3$ | —$C_2H_4CONHCH_3$ | Do. |
| 105 | —$CH_3$ | —$CH_3$ | —$CH_3$ | H | H | —$C_2H_5$ | —$C_2H_4CONHC_2H_5$ | Do. |
| 106 | —$CH_3$ | —$CH_3$ | Cl | H | H | —$C_2H_5$ | —$C_2H_4CONHC_2H_5$ | Do. |
| 107 | —$C_2H_5$ | —$CH_3$ | —$CH_3$ | H | H | —$C_2H_5$ | —$C_2H_4CONHC_2H_5$ | Do. |
| 10 | —$CH_3$ | —$C_2H_5$ | H | H | H | —$C_2H_5$ | $C_2H_4CONHC_2H_5$ | Do. |
| 109 | —$CH_3$ | —$CH_3$ | H | H | H | —$CH_2C_6H_5$ | —$C_2H_4CONHCH_2C_6H_5$ | Do. |
| 110 | —$CH_3$ | —$CH_3$ | H | Cl | H | H | H | Do. |
| 111 | —$CH_3$ | —$CH_3$ | H | H | H | —$C(CH_3)_3$ | —$C_2H_4CONHC(CH_3)_3$ | Do. |
| 112 | —$CH_3$ | —$CH_3$ | H | H | H | —$C(CH_3)_3$ | —$C_2H_5$ | Do. |
| 113 | —$C_2H_5$ | —$CH_3$ | —$OCH_3$ | H | H | —$C(CH_3)_3$ | —$CH_3$ | Do. |
| 114 | —$CH_3$ | —$CH_3$ | H | H | H | 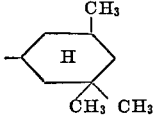 | —$C_2H_5$ | Do. |
| 115 | —$CH_3$ | —$CH_3$ | H | H | H | 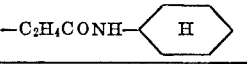 | —$C_2H_4CONH$— | Do. |

In the following Table 2 the structures of additional dyes are set forth. They can be produced by the procedures of Examples 1 or 2 and have the formula

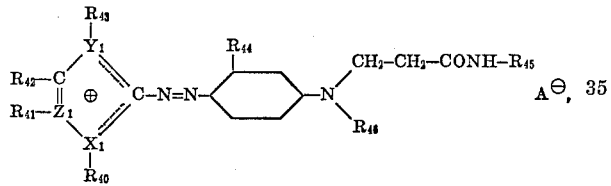

where $R_{40}$ to $R_{46}$, $X_1$, $Y_1$ and $Z_1$ have the meanings given them in the table.

The anion $A^\ominus$ may be any one of those named in the specification.

are stirred into 100 parts of glacial acetic acid; 1.1 parts of magnesium oxide are added, thereto; the resulting mixture is raised to 60° and 6.3 parts of dimethyl sulphate are added in the course of 30 minutes. Stirring is continued for 2–3 hours at 70–75°, following which the mixture is unloaded into 1000 parts of water. On the addition of 50 parts of sodium chloride and 7 parts of zinc chloride the dye settles out and is filtered off, washed and dried. It gives level violet dyeings on polyacrylonitrile fibres which have good fastness to light and wet treatments.

In the following Table 3 the structure of further dyes are indicated. They can be produced by the procedures of

TABLE 2

| Example number: | $X_1$ | $Y_1$ | $Z_1$ | $R_{40}$ | $R_{41}$ | $R_{42}$ | $R_{43}$ | $R_{44}$ | $R_{45}$ | $R_{46}$ | Shade of dyeing on polyacrylonitrile fibre |
|---|---|---|---|---|---|---|---|---|---|---|---|
| 116 | N | N | CH | —$CH_3$ | | H | —$CH_3$ | H | H | —$C_2H_5$ | Bluish red. |
| 117 | N | N | CH | —$CH_3$ | | H | —$CH_3$ | H | H | —$C_2H_4$—$CONH_2$ | Red-violet. |
| 118 | N | N | CH | —$CH_3$ | | —$CH_3$ | —$CH_3$ | —$CH_3$ | H | —$C_2H_4$—$CONH_2$ | Do. |
| 119 | N | N | CH | —$CH_3$ | | H | —$CH_3$ | H | —$C$—$(CH_3)_3$ | —$C_2H_4$—$CONH$—$C(CH_3)_3$ | Do. |
| 120 | N | N | N | —$CH_3$ | | H | —$CH_3$ | H | H | —$C_2H_5$ | Violet. |
| 121 | N | N | N | —$CH_3$ | | H | —$CH_3$ | H | H | —$C_2H_4$—$CONH_2$ | Do. |
| 122 | N | N | N | —$CH_3$ | | H | —$CH_3$ | —$CH_3$ | H | —$C_2H_4$—$CONH_2$ | Do. |
| 123 | N | N | N | —$CH_3$ | | H | —$CH_3$ | Cl | H | —$C_2H_4$—$CONH_2$ | Do. |
| 124 | N | N | N | —$CH_3$ | | H | —$CH_3$ | —$OCH_3$ | H | —$C_2H_4$—$CONH_2$ | Do. |
| 125 | N | N | N | —$CH_3$ | | H | $CH_3$ | H | —$CH_3$ | —$C_2H_4CONH$—$CH_3$ | Do. |
| 126 | N | S | CH | —$CH_3$ | | H | | H | H | —$C_2H_5$ | Bluish red. |
| 127 | N | S | CH | —$CH_3$ | | H | | H | H | —$CH_3$ | Do. |
| 128 | N | S | CH | —$CH_3$ | | H | | H | H | —$C_2H_4$—$CONH_2$ | Do. |
| 129 | N | S | CH | —$CH_3$ | | H | | —$OCH_3$ | H | —$C_2H_4$—$CONH_2$ | Do. |

EXAMPLE 130

9.4 parts of a compound of the formula

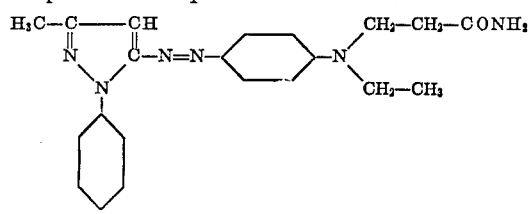

Examples 1 and 130 and are of the formula

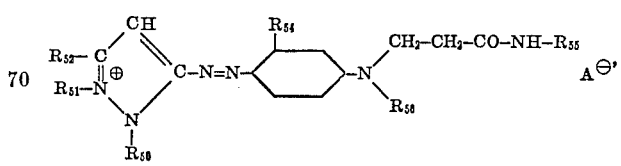

where $R_{50}$ to $R_{52}$ and $R_{54}$ to $R_{56}$ have the meanings assigned to them in the table.

The anion A⊖ may be any one of those named in the specification.

TABLE 3

| Example number: | R₅₀ | R₅₁ | R₅₂ | R₅₄ | R₅₅ | R₅₆ | Shade of dyeing on polyacrylonitrile fibre |
|---|---|---|---|---|---|---|---|
| 131 | —C₆H₅ | —CH₃ | —CH₃ | H | H | —C₂H₄—CONH₂ | Violet. |
| 132 | —C₆H₅ | —CH₃ | —CH₃ | —CH₃ | H | —C₂H₄—CONH₂ | Do. |
| 133 | —C₆H₅ | —CH₃ | —CH₃ | H | —C₂H₅ | —C₂H₄CONH—C₂H₅ | Do. |
| 134 | —C₆H₅ | —CH₃ | —CH₃ | —OCH₃ | H | —C₂H₄—CONH₂ | Red-violet. |
| 135 | —C₆H₅ | —CH₃ | —CH₃ | Cl | H | —C₂H₄—CONH₂ | Do. |
| 136 | —C₆H₅ | —CH₃ | —CH₃ | H | H | —CH₃ | Violet. |
| 137 | —C₆H₅ | —CH₃ | —CH₃ | H | H | —C₄H₉ | Do. |
| 138 | —C₆H₅ | —C₂H₅ | —CH₃ | H | H | —CH₃ | Do. |
| 139 | —C₆H₅ | —C₂H₅ | —CH₃ | H | H | —C₂H₅ | Do. |
| 140 | —C₆H₅ | —C₂H₅ | —CH₃ | H | H | —C₄H₉ | Do. |
| 141 | —C₆H₅ | —C₂H₅ | —CH₃ | H | H | —C₂H₄—CONH₂ | Do. |

EXAMPLE 142

68 parts of the intermediate of the formula

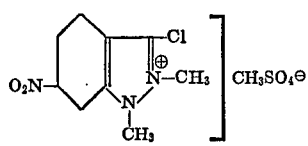

are stirred into 500 parts of water. In the course of 45 minutes the solution is conducted at 0° into a mixture of 60 parts of hydrazine-hydrate in 400 parts of water. The 1,2-dimethyl - 6 - nitro-3-indazolonehydrazone settles out. After stirring for 10 minutes, 120 parts by volume of 1/normal hydrochloric acid are added in portions, whereupon the precipitate goes into solution. The hydrochloride is precipitated by the addition of 100 parts of common salt, filtered off with suction and dried. It can be purified by recrystallization from water.

26 parts of the resulting 1,2-dimethyl-6-nitro-3-indazolone-hydrazonehydrochloride are dissolved in 500 parts of water. A solution of 23.6 parts of N,N-aniline-bis-propionamide in 40 parts of glacial acetic acid is added, followed in 30 minutes by a solution of 10 parts of sodium chloride in 100 parts of water. After stirring for 4 hours at room temperature the mixture is raised to 60–70° and the dye precipitated by the addition of 150 parts of a saturated common salt solution and 28 parts of zinc chloride. On cooling, the precipitate is filtered off, washed with 10% brine and dried. This dye gives level violet dyeings on polyacrylonitrile fibres which have good light and wet fastness properties.

The dyes of Examples 143 to 146 can be produced in analogy with this example; they give dyeings of comparably good quality on polyacrylonitrile fibres.

EXAMPLE 143

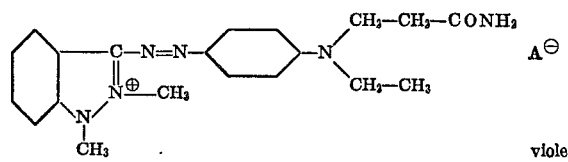

violet

EXAMPLE 144

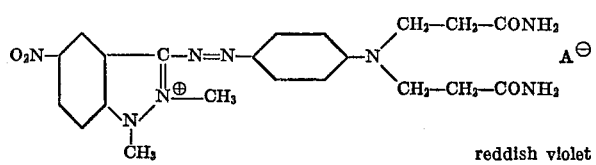

reddish violet

EXAMPLE 145

O₂N—[indazolium]—C=N—N—[phenyl]—N(CH₂—CH₂—CONH₂)(CH₂—CH₂—CH₂—CH₃)  A⊖ violet

EXAMPLE 146

H₃CO—[pyridazinium]—N=N—[phenyl]—N(CH₂—CH₂—CONH₂)₂  A⊖ blush red

EXAMPLE 147

9.75 parts of a compound of the formula

H₃CO—[benzothiazole]—C=N—N—[chlorophenyl]—NH—CH₂—CH₂—CONH₂ are stirred into 100 parts of glacial acetic acid and, after the addition of 1.1 parts of magnesium chloride the mixture is raised to 60–70°. In 30 minutes 6.3 parts of dimethyl sulphate are dropped in and stirring is continued for 3 hours at 70–75°. The mixture is then run into 1000 parts of water and the dye precipitated with 50 parts of sodium chloride and 7 parts of zinc chloride, filtered off, washed and dried. It gives level blue dyeings on polyacrylonitrile fibres, which have good light and wet fastness properties.

EXAMPLE 148

68 parts of the intermediate of the formula

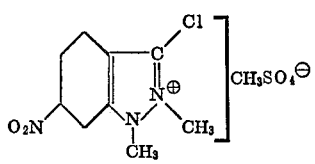

are stirred into 500 parts of water. In 45 minutes the solution is allowed to flow at 0° into a mixture of 60 parts of hydrazine-hydrate in 400 parts of water. The 1,2-dimethyl-6-nitro-3-indazolone-hydrazone settles out. After stirring for 10 minutes, 120 parts by volume of 1/normal hydrochloric acid are added in portions, causing the precipitate to go into solution. The hydrochloride is precipitated with 100 parts of common salt, filtered off with suction, and dried. It can be purified by recrystallization from water.

26 parts of the 1,2-dimethyl-6-nitro-3-indazolone- hydazone-hydrochloride thus formed are dissolved in 500 parts of water. A solution of 19.9 parts of N-β-propionamide-2-chloroaniline in 40 parts of glacial acetic acid is added, followed by 30 minutes by a solution of 10 parts of sodium chloride in 100 parts of water. After stirring for 4 hours at room temperature, the mixture is raised to 60-70° and the dye precipitated by the addition of 150 parts of a saturated common salt solution and 28 parts of zinc chloride. On cooling the precipitate is filtered off, washed with 10% brine and dried. On polyacrylonitrile fibres it produces level violet dyeings of good light and wet fastness.

EXAMPLE 149

9.6 parts of the compound of the formula

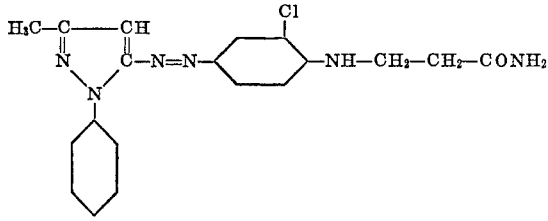

are stirred into 100 parts of glacial acetic acid, and 1.1 parts of magnesium oxide are added to the mixture. After it has been raised to 60°, 6.3 parts of dimethyl sulphate are added dropwise in 30 minutes. The mixture is then stirred further for 2-3 hours at 70-75°. Subsequently, it is unloaded into 1000 parts of water and the dye is precipitated with 50 parts of sodium chloride and 8 parts of zinc chloride, filtered off, washed and dried. This dye dyes polyacrylonitrile fibres in level violet shades which have good fastness to light and wet treatments.

DYEING EXAMPLE

A mixture of 20 parts of the dye of Example 1 and 80 parts of dextrin is ground in a ball mill for 48 hours. One part of the resulting preparation is pasted with 1 part of 40% acetic acid; then 200 parts of dimineralized water are added, with boiling for a short time. The mixture is added to a bath of 7000 parts of demineralized water, with the final addition of 2 parts of glacial acetic acid. 100 parts of a fabric of polyacrylonitrile fibre are entered into the bath at 60°. The fabric can, if desired, be pretreated for 10-15 minutes in a bath of 8000 parts of water and 2 parts of glacial acetic acid at 60°. The dyebath is raised to 98-100° in 30 minutes and held at the boil for 1 hour 30 minutes. On removal, the fabric is washed off. A level blue dyeing with good light and wet fastness properties is obtained.

Formulae of representative dyes of the foregoing examples are as follows:

EXAMPLE 1

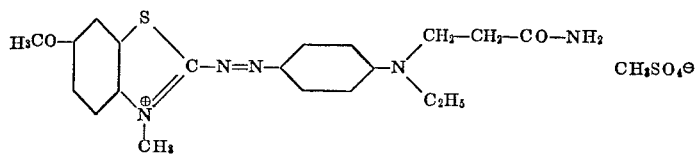

EXAMPLE 2

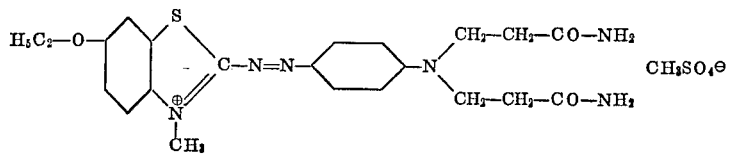

EXAMPLE 6

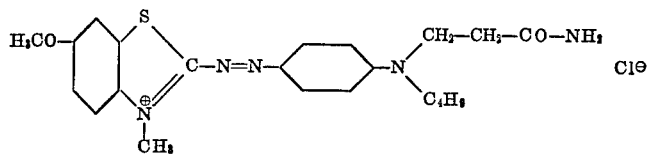

EXAMPLE 12

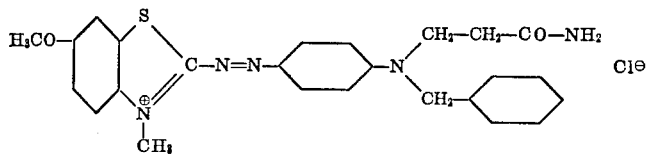

EXAMPLE 18

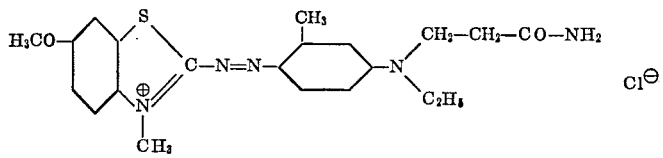

EXAMPLE 21

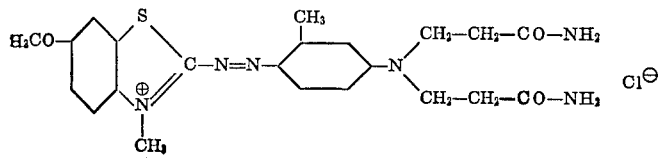

Having thus disclosed the invention what we claim is:
1. A compound of the formula

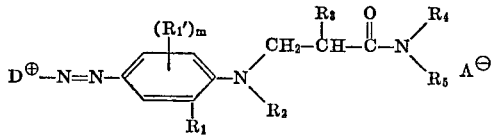

wherein D⊕ is

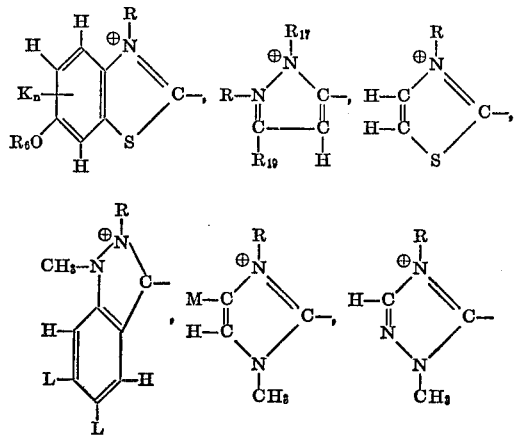

or

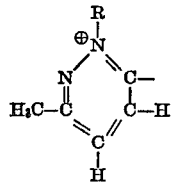

wherein

R is alkyl, substituted alkyl, cyclohexyl or phenyl,
R₁ is hydrogen, halo, alkyl, substituted alkyl, alkoxy or substituted alkoxy,
R₁' is halo, alkyl, substituted alkyl, alkoxy, substituted alkoxy, cyano, nitro, alkylsulfonyl, substituted alkylsulfonyl, phenylsulfonyl, substituted phenylsulfonyl, naphthylsulfonyl, substituted naphthylsulfonyl, tetrahydronaphthylsulfonyl or substituted tetrahydronaphthylsulfonyl,
R₂ is hydrogen, alkyl, substituted alkyl, phenyl, substituted phenyl, naphthyl, substituted naphthyl, tetrahydronaphthyl, substituted tetrahydronaphthyl or

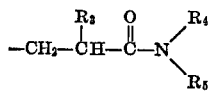

R₃ is hydrogen, alkyl or substituted alkyl,
each R₄ and each R₅ independently is hydrogen, alkyl, substituted alkyl, cyclohexyl, substituted cyclohexyl, phenyl, substituted phenyl, naphthyl, substituted naphthyl, tetrahydronaphthyl or substituted tetrahydronaphthyl, wherein R₆ is alkyl, substituted alkyl, phenyl, substituted phenyl, naphthyl, substituted naphthyl, tetrahydronaphthyl or substituted tetrahydronaphthyl,
R₁₇ is phenyl or substituted phenyl,
R₁₉ is alkyl or substituted alkyl,
K is halo, alkyl, substituted alkyl, alkoxy, cyano, nitro, alkylsulfonyl, substituted alkylsulfonyl, phenylsulfonyl, substituted phenylsulfonyl, naphthylsulfonyl, substituted naphthylsulfonyl, tetrahydronaphthylsulfonyl or substituted tetrahydronaphthylsulfonyl,
L is hydrogen or nitro, with the proviso that only one L can be nitro,
M is hydrogen or methyl,
m is 0 or 1,
n is 0 or 1, and
A⊖ is an anion, wherein each substituent of substituted alkyl, substituted alkoxy, substituted alkylsulfonyl and substituted cyclohexyl independently is halo, hydroxy, cyano, phenyl, substituted phenyl, naphthyl, substituted naphthyl, tetrahydronaphthyl or substituted tetrahydronaphthyl,
each substituent of substituted phenyl, substituted naphthyl, substituted tetrahydronaphthyl, substituted phenoxy, substituted naphthyloxy, substituted tetrahydronaphthyloxy, substituted phenylsulfonyl, substituted naphthylsulfonyl and substituted tetrahydronaphthylsulfonyl independently is halo, hydroxy, cyano, alkyl, alkoxy or phenyl,
each alkyl and alkyl chain of substituted alkyl alkylsulfonyl and substituted alkylsulfonyl independently has 1 to 12 carbon atoms, and
each alkoxy and alkyl chain of substituted alkoxy independently has 1 to 6 carbon atoms.

2. A compound according to claim 1 wherein

R₁ is hydrogen, halo, alkyl, substituted alkyl or alkoxy,
R₁' is halo, alkyl, substituted alkyl, alkoxy, cyano, nitro, methylsulfonyl, ethylsulfonyl or phenylsulfonyl,
R₂ is hydrogen, alkyl, substituted alkyl, phenyl or

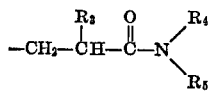

each R₄ and each R₅ independently is hydrogen, alkyl, substituted alkyl, cyclohexyl, trimethylcyclohexyl or phenyl, and each substituent of substituted alkyl independently is halo, hydroxy, cyano or phenyl.

3. A compound according to claim 2 wherein

R is alkyl,
R₁ is hydrogen, halo, alkyl or alkoxy,
R₁' is halo, alkyl or alkoxy,
R₃ is hydrogen or alkyl,
each substituted alkyl is monosubstituted alkyl and the substituent of each monosubstituted alkyl independently is hydroxy or phenyl,
each alkyl and alkyl chain of substituted alkyl independently has 1 to 4 carbon atoms, and
each alkoxy independently has 1 to 3 carbon atoms.

4. A compound according to claim 2 wherein

D⊕ is

5. A compound according to claim 4 having the formula

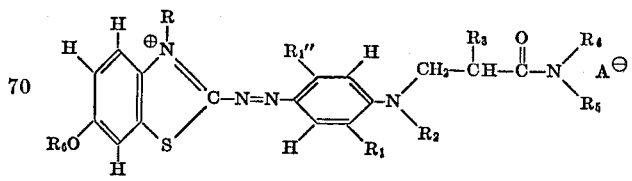

wherein R₁'' is hydrogen or R₁'.

6. A compound according to claim 5
wherein
R is methyl or ethyl,
$R_1$ is hydrogen, halo, alkyl or alkoxy,
$R_1''$ is hydrogen, halo, alkyl or alkoxy,
$R_2$ is hydrogen, alkyl, monosubstituted alkyl, phenyl or

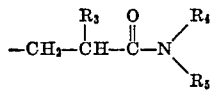

$R_3$ is hydrogen or alkyl,
each $R_4$ and each $R_5$ independently is hydrogen, alkyl, monosubstituted alkyl, cyclohexyl, 3,3,5-trimethylcyclohexyl or phenyl,
$R_6$ is alkyl or phenyl,
the substituent of each monosubstituted alkyl independently is hydroxy or phenyl,
each alkyl and alkyl chain of monosubstituted alkyl independently has 1 to 4 carbon atoms, and
each alkoxy independently has 1 to 3 carbon atoms.

7. A compound according to claim 6
wherein
$R_1$ is hydrogen, alkyl, alkoxy or chloro,
$R_1''$ is hydrogen, alkyl, alkoxy or halo,
$R_2$ is hydrogen, alkyl, β-hydroxyethyl, benzyl, phenyl or

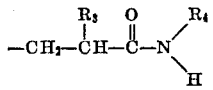

$R_3$ is hydrogen or methyl,
each $R_4$ independently is hydrogen, alkyl, benzyl, phenyl, cyclohexyl or 3,3,5-trimethylcyclohexyl, and
$R_5$ is hydrogen.

8. A compound according to claim 7
wherein
$R_1$ is hydrogen, methyl, methoxy or chloro, and
$R_1''$ is hydrogen, methyl, methoxy or halo.

9. A compound according to claim 8
wherein
$R_1$ is hydrogen,
$R_1''$ is hydrogen or methyl,
$R_2$ is methyl, ethyl, butyl or

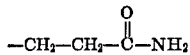

$R_3$ is hydrogen,
$R_4$ is hydrogen, and
$R_6$ is methyl or ethyl.

10. A compound according to claim 9
wherein $R_2$ is

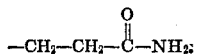

11. A compound according to claim 4 having the formula

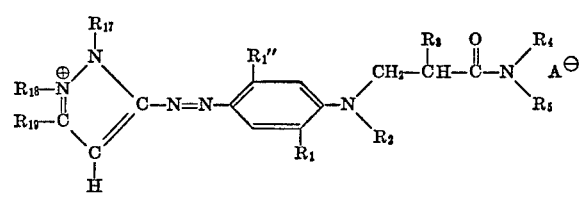

wherein $R_{18}$ is alkyl or substituted alkyl.

12. A compound according to claim 11
wherein
each substituted alkyl is monosubstituted alkyl,
each alkyl and alkyl chain of monosubstituted alkyl has 1 to 4 carbon atoms, and
each alkoxy independently has 1 to 3 carbon atoms.

13. A compound according to claim 12
wherein $R_1''$ is hydrogen.

14. A compound according to claim 11
wherein
$R_1$ is hydrogen, alkyl or alkoxy,
$R_1''$ is hydrogen, halo, alkyl or alkoxy,
$R_3$ is hydrogen or methyl,
$R_5$ is hydrogen,
$R_{17}$ is phenyl,
$R_{18}$ is alkyl, and
$R_{19}$ is alkyl.

15. A compound according to claim 14
wherein
each alkyl independently has 1 to 4 carbon atoms, and
each alkoxy independently has 1 to 3 carbon atoms.

16. A compound according to claim 15
wherein
$R_1$ is hydrogen,
$R_1''$ is hydrogen, chloro, methyl or methoxy,
$R_2$ is methyl, ethyl, butyl,

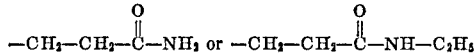

$R_3$ is hydrogen,
$R_4$ is hydrogen, methyl or ethyl,
$R_{18}$ is methyl or ethyl, and
$R_{19}$ is methyl or ethyl.

17. A compound according to claim 9 of the formula

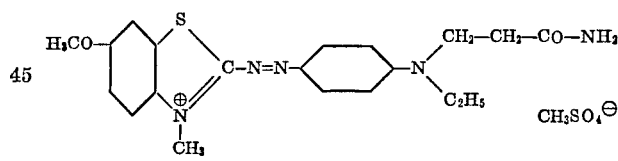

18. A compound according to claim 10 of the formula

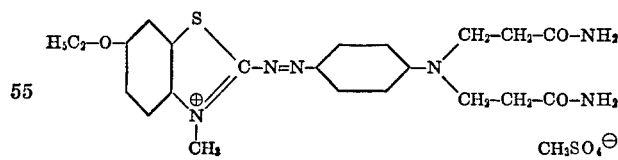

19. A compound according to claim 9 of the formula

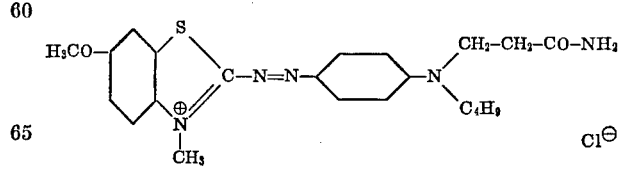

20. A compound according to claim 8 of the formula

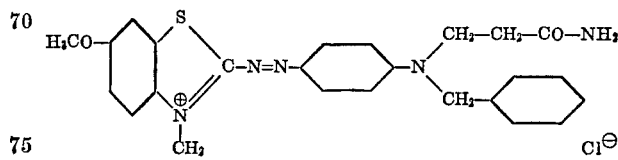

21. A compound according to claim 9 of the formula
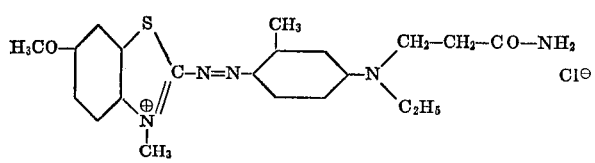
22. A compound according to claim 10 of the formula
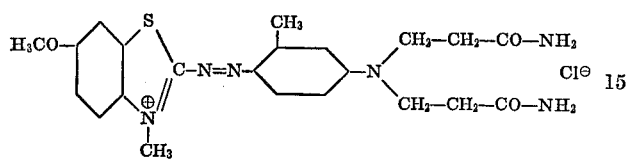
References Cited
UNITED STATES PATENTS
| | | | |
|---|---|---|---|
| 2,346,013 | 4/1944 | Dickey | 260—158 X |
| 3,132,132 | 5/1964 | Suzuki et al. | 260—158 |
| 3,287,347 | 11/1966 | Hahn et al. | 260—158 |
| 3,349,075 | 10/1967 | Wallace et al. | 260—158 |
| 3,417,139 | 12/1968 | Towle et al. | 260—158 X |
| 3,483,180 | 12/1969 | Ramonathan | 260—158 |
| 3,254,073 | 5/1966 | Wallace et al. | 260—187 |
| 3,332,930 | 7/1967 | Mohr et al. | 260—157 X |
| 3,503,953 | 3/1970 | Loffelman | 260—162 X |
FLOYD DALE HIGEL, Primary Examiner
U.S. Cl. X.R.
8—41 A; 117—138.8 R; 260—146 R, 152, 154, 155, 156, 157, 163, 310 C, 558 A, 559 A